(12) United States Patent
Marchgraber et al.

(10) Patent No.: US 8,906,497 B2
(45) Date of Patent: *Dec. 9, 2014

(54) FOAM ELEMENT WITH HYDROPHILIC SUBSTANCES INCORPORATED IN IT

(75) Inventors: Manfred Marchgraber, Kremsmuenster (AT); Franz Schaufler, Kremsmuenster (AT)

(73) Assignee: Eurofoam GmbH, Kremsmuenster (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/136,058

(22) Filed: Jul. 21, 2011

(65) Prior Publication Data

US 2012/0003456 A1    Jan. 5, 2012

Related U.S. Application Data (63) Continuation of application No. PCT/AT2010/000021, filed on Jan. 21, 2010.

(60) Provisional application No. 61/253,949, filed on Oct. 22, 2009.

(30) Foreign Application Priority Data

Jan. 22, 2009    (AT) .................. A 101/2009

(51) Int. Cl.
*B32B 5/18* (2006.01)
*C08J 9/00* (2006.01)
*C08J 9/35* (2006.01)

(52) U.S. Cl.
CPC    *C08J 9/0061* (2013.01); *C08J 9/35* (2013.01); *C08J 2400/30* (2013.01); *C08J 2401/00* (2013.01)
USPC ...................................... 428/317.9

(58) Field of Classification Search
USPC ........... 427/243, 244, 245; 428/36.5, 71, 158, 428/304.4, 306.6, 308.4, 309.9, 311.11, 428/311.51, 311.71, 311.91; 516/10; 264/41, 415; 521/52, 99, 109.1, 155, 521/170
See application file for complete search history.

(56) References Cited

U.S. PATENT DOCUMENTS 3,021,290 A    2/1962    Gmitter et al.
3,156,242 A    11/1964    Crowe, Jr.
(Continued)

FOREIGN PATENT DOCUMENTS

DE    1 719 053    1/1971
DE    1 769 187    10/1971
(Continued)

OTHER PUBLICATIONS

Önorm EN ISO 8307, Dec. 2007. (Edition Mar. 1, 2008—English version, eighteen (18) pages).

(Continued)

*Primary Examiner* — Maria Veronica Ewald
*Assistant Examiner* — Laura Auer
(74) *Attorney, Agent, or Firm* — Collard & Roe, P.C.

(57) ABSTRACT

The invention relates to a foam element (7) made from a foam and particles (11) of at least one hydrophilic substance such as cellulose, superabsorbers. The foam element (7) containing the particles (11) has a reversible capacity to absorb moisture. A part of the particles (11) is completely embedded in the foam. Another part of the particles (11) is disposed protruding out from a surface (13) of the foam, such as cell walls (9) or cell webs (10). The foam without the hydrophilic substance has an absorption capacity of more than 2.8% by weight at an equilibrium moisture corresponding to a temperature of 23° C.

25 Claims, 4 Drawing Sheets

(56) References Cited

U.S. PATENT DOCUMENTS

| | | | |
|---|---|---|---|
| 3,826,674 A * | 7/1974 | Schwarz | 428/319.7 |
| 3,956,202 A | 5/1976 | Iwasaki | |
| 4,254,177 A | 3/1981 | Fulmer | |
| 4,464,428 A | 8/1984 | Ebert et al. | |
| 4,615,880 A | 10/1986 | Loth et al. | |
| 4,664,105 A | 5/1987 | Dautzenberg et al. | |
| 4,950,597 A | 8/1990 | Saxena et al. | |
| 5,260,345 A | 11/1993 | DesMarais et al. | |
| 5,719,201 A | 2/1998 | Wilson | |
| 5,763,335 A | 6/1998 | Hermann | |
| 6,025,287 A | 2/2000 | Hermann | |
| 2003/0045847 A1 * | 3/2003 | Whitmore et al. | 604/368 |
| 2003/0216483 A1 * | 11/2003 | Hermann et al. | 521/50 |
| 2006/0246272 A1 * | 11/2006 | Zhang et al. | 428/304.4 |
| 2008/0215026 A1 | 9/2008 | Schornick et al. | |
| 2009/0234039 A1 | 9/2009 | Schuette et al. | |

FOREIGN PATENT DOCUMENTS

| | | |
|---|---|---|
| DE | 31 48 710 | 7/1983 |
| DE | 695 10 953 | 12/1999 |
| DE | 199 30 526 | 1/2001 |
| DE | 101 13 900 A1 | 9/2002 |
| DE | 101 16 757 | 10/2002 |
| DE | 697 34 282 | 6/2006 |
| EP | 0 894 814 | 2/1999 |
| EP | 0 793 681 | 7/1999 |
| EP | 1 472 945 | 11/2004 |
| ES | 2 251 026 T3 | 4/2006 |
| FR | 1 239 132 | 8/1960 |
| GB | 871 291 A | 6/1961 |
| GB | 930 501 | 7/1963 |
| GB | 1 063 474 | 3/1967 |
| GB | 1 180 316 | 2/1970 |
| JP | 61-151247 | 7/1986 |
| JP | 2004-332188 | 11/2004 |
| JP | 2009-203412 | 9/2009 |
| RU | 2 099 093 C1 | 12/1997 |
| RU | 2 127 102 C1 | 3/1999 |
| SU | 1809832 A1 | 4/1993 |
| WO | WO 96/16099 | 5/1996 |
| WO | WO 96/31555 | 10/1996 |
| WO | WO 97/44183 | 11/1997 |
| WO | WO 97/44183 A1 | 11/1997 |
| WO | WO 99/58091 A1 | 11/1999 |
| WO | WO 03/097345 | 11/2003 |
| WO | WO 2006/094977 | 9/2006 |
| WO | WO 2007/135069 | 11/2007 |

OTHER PUBLICATIONS

International Search Report of PCT/AT2010/000021, Dec. 9, 2010.

Önorm EN ISO 8307, Dec. 2007, twelve (12) pages.

Rivera-Armenta et al., "New polyurethane foams modified with cellulose derivatives," European Polymer Journal 40 (2004), pp. 2803-2812.

International Search Report of PCT/AT2010/000022 (mailed Jun. 10, 2010).

Mari Granström, "Cellulose Derivatives: Synthesis, Properties and Applications" 2009 http://helda.helsinki.fi/bitstream/handle/10138/21145/cellulos.pdf?sequence=2.

D. Klemm et al. "Cellulose", 2002; http://www.wiley-vch.de/books/biopoly/pdfv06/bpol6010__275__287.pdf.

Mark S. Alger, "Polymer Science Dictionary", 1997, p. 309.

* cited by examiner

FOAM ELEMENT WITH HYDROPHILIC SUBSTANCES INCORPORATED IN IT

CROSS REFERENCE TO RELATED APPLICATIONS

Applicants claim priority under 35 U.S.C. §119 of Austrian Application No. A 101/2009 filed Jan. 22, 2009 and under 35 U.S.C. §119(e) of U.S. Provisional Patent Application Ser. No. 61/253,949 filed Oct. 22, 2009. Applicants also claim priority and this application is a continuation under 35 U.S.C. §120 of International Application No. PCT/AT2010/000021 filed Jan. 21, 2010, which claims priority under 35 U.S.C. §119 of Austrian Application No. A 101/2009 filed Jan. 22, 2009 and under 35 U.S.C. §119(e) of U.S. Provisional Patent Application Ser. No. 61/253,949 filed Oct. 22, 2009. The International Application under PCT article 21(2) was not published in English. The disclosures of the aforesaid International Application, Austrian Application and Provisional Application are incorporated herein by reference.

BACKGROUND OF THE INVENTION

The invention relates to a foam element made from a foam and particles comprising at least one hydrophilic substance incorporated in the plastic, such as cellulose, superabsorbers, and the foam element containing the particles has a reversible capacity to absorb moisture.

These days, foams are used or employed in many areas of daily life. In many of these applications, the foams are in contact with the body, usually separated by only one or more textile intermediate layers. Most of these foams are made from synthetic polymers such as polyurethane (PU), polystyrene (PS), synthetic rubber, etc., which in principle do not have an adequate water absorption capacity. Particularly during longer periods of contact with the body or when undertaking strenuous exercise, an unpleasant physical climate develops due to the large amount of moisture that is not absorbed. For most applications, therefore, it is necessary for hydrophilic properties to be imparted to such foams.

This can be achieved in a number of ways. One option, as described in patent specification DE 199 30 526 A for example, is to render the foam structure of a polyurethane flexible foam hydrophilic. This is done by reacting at least one polyisocyanate with at least one compound containing at least two bonds which react with isocyanate in the presence of sulphonic acids containing one or more hydroxyl groups, and/or their salts and/or polyalkylene glycol ethers catalysed by monools. Such foams are used for domestic sponges or hygiene articles.

Another option is described in patent specification DE 101 16 757 A1, based on an open-pored hydrophilic aliphatic polymethane foam with an additional separate layer made from cellulose fibres with a hydrogel embedded in it, serving as a storage means.

Patent specification EP 0 793 681 B1 and the German translation of DE 695 10 953 T2 disclose a method of producing flexible foams, for which superabsorber polymers (SAPs), also known as hydrogels, are used. The SAPs which are used may be pre-mixed with the prepolymer, which makes the method very simple for the foam manufacturer. Such SAPs may be selected from SAPs grafted with starch or cellulose using acrylonitrile, acrylic acid or acrylamide as an unsaturated monomer for example. Such SAPs are sold by Höchst/Cassella under the name of SANWET IM7000.

Patent specification WO 96/31555 A2 describes a foam with a cellular structure and the foam also contains superabsorber polymers (SAPs). In this instance, the SAP may be made from a synthetic polymer or alternatively from cellulose. The foam used in this instance is intended to absorb moisture and fluids and retains them in the foam structure.

Patent specification WO 2007/135069 A1 discloses shoe soles with water-absorbing properties. In this instance, water-absorbing polymers are added prior to foaming the plastic. Such water-absorbing polymers are usually made by polymerising an aqueous monomer solution and then optionally crushing the hydrogel. The water-absorbing polymer and the dried hydrogel made from it is then preferably ground and screened once it has been produced, and the particle sizes of the screened, dried hydrogel is preferably smaller than 1000 µm and preferably bigger than 10 µm. In addition to the hydrogel, filler may also be added and mixed in before the foaming process, in which case the organic fillers which may be used include carbon black, melamine, rosin and cellulose fibres, polyamide, polyacrylonitrile, polyurethane or polyester fibres based on the principle of aromatic and/or aliphatic dicarboxylic acid esters and carbon fibres, for example. All of the substances are added to the reaction mixture separately from one another in order to produce the foam element.

In terms of their properties, foams known from the prior art are designed so that they are able to store and retain the moisture they absorb for a long period of time. The absorbed moisture and the absorbed water is not restored to the full initial state due to evaporation of the moisture to the ambient atmosphere until after a period of 24 hours, as explained in WO 2007/135069 A1.

This evaporation rate is much too slow for normal applications, such as in mattresses, shoe insoles or vehicle seats, for example, which are used for several hours a day and therefore have much less than 24 hours in order to evaporate the absorbed moisture. In this context, one might speak of an equilibrium moisture and the moisture value is that at which the foam is in equilibrium with the moisture contained in the ambient atmosphere. Accordingly, the underlying objective of this invention is to propose a foam element, which, in terms of its moisture management, has a high capacity to absorb moisture and then exhibits a high evaporation rate of the absorbed, stored moisture.

This objective is achieved in accordance with the invention. The advantage of the features according to the invention resides in the fact that even with a foam containing no added hydrophilic substance, a higher moisture absorption can be obtained for a pre-definable exposure to moisture, and this can be further improved by adding particles which absorb and rapidly evaporate moisture again. As a result, not only is it possible to absorb and store a high quantity of moisture over a given period during use, the moisture evaporates rapidly into the environment again after use. This means that a dried foam element is ready for use again after a relatively short period of time. A further advantage is that not all of the particles contained in the foam are completely surrounded by it, thereby offering greater possibilities for contact with the ambient conditions, both for the uptake of moisture and for evaporation of the moisture. This part-quantity of particles therefore results in a relatively rapid and high absorption capacity for the moisture or fluid to be absorbed, but the absorbed moisture or fluid is evaporated to the ambient atmosphere as rapidly as possible again from the state induced by use, thereby restoring the equilibrium moisture. This results in rapid removal of the moisture making renewed use possible within a short time.

The advantage of the features in an embodiment resides in the fact that in spite of the particles incorporated in the foam, a compression hardness suitable for the intended purpose can be obtained. This means that depending on the intended purpose of the foam element, compression hardness values can be pre-defined but the user can still be guaranteed optimum moisture management of the foam element as a whole. Due to the high value of the temporary storage of moisture or water which can be absorbed in the foam element during use, the user can be guaranteed to experience a pleasant and dry feeling during use. As a result, the body does not come into direct contact with the moisture.

The advantage gained as a result of the features in another embodiment resides in the fact that again depending on the intended purpose of the foam element, sufficient elasticity can still be achieved for different purposes in spite of the added particles constituting the hydrophilic substance, thereby imparting an associated support effect for the user of the foam element. Accordingly, it is possible to guarantee user comfort within predefined limits whilst simultaneously affording adequate moisture management.

The advantage gained as a result of the features in another embodiment resides in the fact that a high moisture absorption of the foam can be achieved which is higher than that of conventional foam. It is therefore not only possible to obtain a high capacity to absorb moisture, the latter is able to evaporate from the foam element at the end of use in a relatively short time, thereby rendering it fit for use again. This being the case, a dry foam element is quickly ready for use again.

The advantage gained as a result of the features in another embodiment resides in the fact that the foam proposed as an initial material already has a high absorption capacity without adding the hydrophilic substance, but this can easily by adapted to a range of different usage conditions by additionally incorporating the particles depending on the amount used as a proportion by weight. By varying the quantity of added particles, not only can the moisture management of the foam element be adjusted, the various associated strength values and elasticity can also be adjusted. The higher the proportion of particles is, the lower the elasticity, which can be compensated by increasing the weight by volume or density.

The advantage gained as a result of the features in another embodiment resides in the fact that due to the increase in the weight by volume or density in conjunction with the particles added with a view to obtaining good moisture management, sufficient elasticity values can also be obtained. As a result, not only is it possible to obtain a very high capacity to absorb water vapor and absorb moisture followed by a rapid rate of evaporation, the corresponding elasticity and the associated supporting effect for the user can be comfortably adjusted accordingly.

By adding cellulose to the foam structure in accordance with another embodiment, it is also possible to obtain a sufficient capacity to absorb moisture or fluid, and the absorbed moisture or fluid evaporates to the ambient atmosphere as rapidly as possible after use so that the equilibrium moisture is restored. As a result, whilst being comfortable to use, moisture absorbed by the foam element evaporates rapidly. This being the case, even after having absorbed a high amount of moisture, it can be used again even after a relatively short period of time and a dried foam element is quickly ready for use again.

Also of advantage is another embodiment, whereby depending on the resultant foam structure of the foam, the fiber length can be set so as to ensure optimum moisture transport, to obtain both rapid absorption and rapid evaporation after use.

An embodiment is also of advantage because it enables an even finer distribution of the cellulose particles in the foam structure to be achieved, as a result of which the foam element can be easily adapted to suit different applications.

Another embodiment enables the pouring capacity of the particles to be improved. The specific surface is increased due to the surface structure, which is irregular and not completely smooth, which contributes to an outstanding adsorption behavior of the cellulose particles.

Another embodiment offers the possibility of using such particles without clogging the fine orifices in the nozzle plate, even when using so-called $CO_2$ foaming.

Also of advantage is another embodiment because a spherical shape is avoided as a result and an irregular surface without fibrous fraying and fibrils is obtained. A rod-shaped design is avoided and this is conducive to efficient distribution within the foam structure.

As a result of another embodiment, the absorption capacity and evaporation capacity of the foam element can be easily adjusted depending on the added proportion of cellulose, thereby enabling it to be adapted to different applications.

As a result of another embodiment, the cellulose can be added and displaced during the manufacturing process at the same time as at least one other additive, which means allowance has to be made for only a single additive when mixing it in a reaction component.

Also of advantage is another embodiment because it enables the use of particles which can be easily made from natural materials. This again enables the absorption capacity and evaporation of moisture of the foam element to be adapted to suit a range of different applications.

An embodiment is also of advantage because a natural material can be used but it is still possible to prevent unpleasant odors nevertheless.

As a result of another embodiment, the particles are additionally encased in a coating without impairing the capacity to absorb and evaporate moisture. This affords additional protection for the particles inside the foam element and enables deterioration of the particles to be delayed or even totally prevented, especially in the region of cut edges.

Based on another embodiment, mutual admixing of the particles in one of the base materials used to make the foam is prevented, thereby ensuring a uniform distribution of the particles inside the foam element as a whole during the foaming process. A virtually uniform distribution of particles through the entire cross-section of the foam element to be produced can be achieved as a result.

Also of advantage is another embodiment because the particles are disposed on the surface of cell walls and cell webs which means that there is a high concentration of particles for absorbing moisture and for moisture evaporation in these areas of foams with open pores. This enables the storage and evaporation behavior to be even further improved for example.

As a result of another embodiment, the coating applied to the foam element can be adapted to suit different applications because moisture can be absorbed by the surface of the foam element, which is already large in size, and evaporated through the particles contained in the coating.

As a result of another embodiment, adding a natural material has a positive effect on the user when he comes into direct or indirect contact with the foam element. The added material, which contains valuable substances, may also be used to provide a healing, soothing or protective effect.

An embodiment is of advantage because the foam element obtained can be used in a range of different applications.

Based on another embodiment, even better transport of the moisture inside the foam element is achieved.

Using the foam element for a range of different applications is also of advantage because it improves wearing comfort during use and the subsequent drying time is also significantly faster. This is of particular advantage in the case of different types of seats and mattresses, as well all those types of applications in which moisture is exuded by the body.

Embedding the particles inside the cell structure enables moisture to be absorbed by the particles disposed in the peripheral region of the cell walls and cell webs, which means that the space inside the cell walls and cell webs is also used for moisture management. This means that absorbed moisture can be directed from the particles disposed in the peripheral region into the interior of the foam structure. This further improves absorption capacity and subsequent evaporation of the moisture.

BRIEF DESCRIPTION OF THE DRAWING

To provide a clearer understanding, the invention will be explained in more detail below with reference to the appended drawings.

These are simplified diagrams illustrating the following.

DETAILED DESCRIPTION

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

A more detailed explanation will firstly be given of the hydrophilic substance, provided in the form of cellulose for example, incorporated in the plastic foam, in particular in the foam element made from it.

However, it would also be possible to add other hydrophilic substances. These might be superabsorbers, for example, or alternatively particles made from a range of different timber materials. These materials may have a particle size of less than 400 μm. If particles made from timber material are used, it is of advantage if they are coated with a substance which inhibits or prevents rotting. Another option would be to fully impregnate them. Independently of the above, however, it would also be possible to encase the particles of timber materials with a plastic material by an extrusion process or embed them in it and then reduce them to the desired particle size by a chopping process such as shredding or grinding.

The foam element is therefore made from the plastic foam and the hydrophilic substance incorporated in it. The plastic foam may in turn be made up from an appropriate mixture of components which can be foamed with one another, preferably in liquid form, in a manner which has long been known.

As already explained above, cellulose fibres are added in addition to the water absorbing polymer as an extra filler in patent specification WO 2007/135 069 A1. These are intended to enhance the mechanical properties of the foam as necessary. In this respect, however, it has been found that adding fibrous additives makes it more difficult to process the initial mixture to be foamed because its flow behaviour changes. For example, fibrous cellulose particles mixed with the polyol component in particular prior to foaming would make it more viscous, which would make it more difficult or even totally impossible to mix with the other component, namely isocyanate, in the metering head of the foaming unit. It could also make it more difficult to spread the reaction compound through flow on the conveyor belt of the foaming unit. The fibrous cellulose particles might also have more of a tendency to adhere in the conveyor lines for the reaction mixture, forming deposits.

As a result, it is only possible to add fibrous additives within certain limits. The smaller the quantity of fibrous additives as a proportion, in particular cellulose short-cut fibres, the lower the water absorption capacity is when it is added to foam. Even adding small quantities of fibrous cellulose powder can be expected to increase viscosity, especially of the polyol component. Although it is possible to process such mixtures in principle, allowance has to be made for the altered viscosity during processing.

Cellulose and yarns, fibres or powders made from it are usually obtained by processing and grinding cellulose or alternatively wood and/or annual plants, in a generally known manner.

Depending on the nature of the production process, powders of different qualities are obtained (purity, size, etc.). What all these powders have in common is a fibrous structure because natural cellulose of any size has a marked tendency to form such fibrous structures. Even MCC (microcrystalline cellulose), which can be described as spherical, is still made up of crystalline fibre pieces.

Depending on the microstructure, a distinction is made between different structure types of cellulose, in particular cellulose-I and cellulose-II. These differences between these two structure types are described at length in the relevant reference literature and can also be seen using X-ray technology.

A major part of cellulose powders consists of cellulose-I. The production and use of cellulose-I powders is protected by a large number of patents. Also protected are many technical details of the grinding process, for example. Cellulose-I powders are of a fibrous nature, which is not very conducive to a number of applications and can even be a hindrance. For example, fibrous powders often lead to hooking of the fibres. They are also associated with a limited ability to flow freely.

Cellulose powders with a base of cellulose-II are currently very difficult to find on the market. Such cellulose powders with this structure may be obtained either from a solution (usually viscose) or by grinding cellulose-II products. Such a product might be cellophane, for example. Such fine powders with a grain size of von 10 μm and less can also be obtained in very small quantities only.

Spherical, non-fibrillar cellulose particles with a particle size in the range of between 1 μm and 400 μm can be produced from a solution of non-derivatised cellulose in a mixture or organic substance and water. This particle size may also be used for all the other added particles. This solution is cooled free flowing to below its setting temperature and the solidified cellulose solution is then ground. The solvent is then washed out and the ground particles dried. The subsequent grinding is usually done in a mill.

It is of particular advantage if at least individual ones of the following additives are incorporated in the pre-prepared cellulose solution prior to cooling it and subsequently setting it. This additive may be selected from the group comprising pigments, inorganic substances such as titanium oxide for example, in particular below stoichiometric titanium dioxide, barium sulphate, ion exchangers, polyethylene, polypropylene, polyester, carbon black, zeolite, activated carbon, polymeric superabsorbers or flame retardants. They are then simultaneously incorporated in the cellulose particles produced subsequently. They can be added at various points whilst producing the solution but in any case prior to setting. In this respect, 1% by weight to 200% by weight of additives may be incorporated, relative to the cellulose quantity. It has been found that these additives are not removed during washing but remain in the cellulose particles and also largely retain their function. If incorporating activated carbon, for example, it will be found that its active surface, which can be measured using the BET method for example, is also preserved intact in the finished particle. Not only the additives at the surface of the cellulose particles but also those in the interior are likewise fully preserved. This may be regarded as particularly beneficial because only small quantities of additives have to be incorporated in the pre-prepared cellulose solution.

The advantage of this is that it is only the cellulose particles already containing the functional additives which have to be added to the reaction mixture for producing the foam element. Whereas in the past all the additives have been added separately and individually to the reaction mixture, it is now only necessary to take account of one type of additive when setting up the foaming process. This avoids any uncontrollable fluctuations with regard to the suitability of many of these different additives.

As a result of this approach, only one cellulose powder is obtained, which is made up of particles with a cellulose-II structure. The cellulose powder has a particle size in a range with a lower limit of 1 μm and an upper limit of 400 μm for a mean particle size x50 with a lower limit of 4 μm and an upper limit of 250 μm for a monomodal particle size distribution. The cellulose powder or the particles have an approximately spherical particle shape with an irregular surface and a crystallinity in a range with a lower limit of 15% and an upper limit of 45% based on the Raman method. The particles also have a specific surface (N2-Adsorbtion, BET) with a lower limit of 0.2 $m^2/g$ and an upper limit of 8 $m^2/g$ for a bulk density with a lower limit of 250 g/l and an upper limit of 750 g/l auf.

The cellulose-II structure is produced by dissolving and re-precipitating the cellulose, and the particles are different in particular from the particles made from cellulose without a dissolution step.

The particle size in the above-mentioned range with a lower limit of 1 μm and an upper limit of 400 μm with a particle distribution characterised by a x50 value with a lower limit of 4 μm, in particular 50 μm, and an upper limit of 250 μm, in particular 100 μm, is naturally affected by the operating mode used for grinding during the milling process. However, this particle distribution can be obtained particularly easily by adopting the specific production method based on setting a free flowing cellulose solution and due to the mechanical properties imparted to the set cellulose compound. Applying shearing forces to a set cellulose solution under the same grinding conditions would result in different but fibrillous properties.

The shape of the particles used is approximately spherical. These particles have an axial ratio (l:d) within a lower limit of 0.5, in particular 1, and an upper limit of 5 m in particular 2.5. They have an irregular surface but do not show up any fibre-like fraying or fibrils under the microscope. These are absolutely not spheres with a smooth surface. Nor would such a shape be particularly suitable for the intended applications.

The bulk density of the cellulose powders described here, which lies between a lower limit of 250 g/l and an upper limit of 750 g/l, is significantly higher than comparable fibrillar particles known from the prior art. The bulk density has significant advantages in terms of processing because it also improves the compactness of the described cellulose powder and amongst other things also results in better flow capacity, miscibility in a range of different media and fewer problems during storage.

In summary, it may be said that the resultant particles of cellulose powder are able to flow more freely due to their spherical structure and induce hardly any changes in viscosity due to their structure. Characterising the particles by means of the particle sizing equipment widely used in the industry is also easier and more meaningful due to the spherical shape. The not completely smooth and irregular surface structure results in a bigger specific surface, which contributes to the outstanding adsorption behaviour of the powder.

Independently of the above, however, it would also be possible to mix a pure cellulose powder or particles of it with other cellulose particles, which also contain incorporated additives within a lower limit of 1% by weight and an upper limit of 200% by weight by reference to the quantity of cellulose. Individual ones of these additives may also be selected from the group comprising pigments, inorganic substances such as titanium oxide for example, in particular below stoichiometric titanium dioxide, barium sulphate, ion exchangers, polyethylene, polypropylene, polyester, activated carbon, polymeric superabsorbers and flame retardants.

Depending on the foaming method used to produce the foams, the spherical cellulose particles have proved to be particularly practical compared with the known fibrous cellulose particles, especially in the case of $CO_2$ foaming. $CO_2$ foaming may be run using the Novaflex-Cardio method or similar processes, for example, in which nozzle plates with particularly fine orifices are used. Coarse and fibrous particles would immediately block the nozzle orifices and lead to other problems. For this reason, the high degree of fineness of the spherical cellulose particles is of particular advantage for this specific foaming process.

The foam element and the approach to producing the foam element proposed by the invention will now be explained in more detail with reference to a number of examples. These should be construed as possible embodiments of the invention but the invention is in no way limited to the scope of these examples.

The figures relating to moisture as a % by weight relate to the mass or weight of the foam element as a whole (plastic foam, cellulose particles and water or moisture).

Example 1

The foam element to be produced may be made from a plastic foam such as a polyurethane flexible foam for example, and a whole range of different manufacturing options and methods may be used. Such foams usually have an open-cell foam structure. This can be obtained using a "QFM" foaming machine made by the Hennecke company, and the foam is produced in a continuous process by a high-pressure metering process. All the necessary components are exactly metered under the control of a computer via controlled pumps and mixed using the stirring principle. In this particular case, one of these components is polyol, which is displaced with the cellulose particles described above. Since the cellulose particles are mixed with one reaction component, polyol, various adjustments have to be made to the formula, such as the water, catalysts, stabilisers and TDI in order to largely neutralise the effect of the cellulose powder incorporated for production purposes and the subsequent physical values obtained.

One possible foam based on the invention was produced with 7.5% by weight of spherical cellulose particles. To this end, a spherical cellulose powder was firstly produced, which was then added to a reaction component of the foam to be produced. In terms of quantity, the proportion of particles, in particular the cellulose, by reference to the total weight of the foam, in particular the plastic foam may be within a lower limit of 0.1% by weight, in particular 5% by weight, and an upper limit of 35% by weight, in particular 20% by weight.

Example 2

Comparative Example

To permit a comparison with example 1, a foam element was made from a plastic foam, which was produced without adding cellulose powder or cellulose particles. This might be standard foam, an HR-foam or a viscose foam, each made up by a known formula and then foamed.

The first objective was to ascertain whether the cellulose particles were uniformly distributed through all layers of the resultant foam element in terms of height. This was done by determining a so-called equilibrium moisture based on the water uptake of the foams in a standard climate at 20° C. and 55% r.h. and in another standardised climate at 23° C. and 93% r.h. To this end, sample pieces of the same size were taken from the foam blocks made as specified in example 1 and example 2 at three different heights and the water uptake in the two standardised climates described above was measured. In this respect, 1.0 m represents the top layer of the foam block, 0.5 m the middle layer and 0.0 m the bottom layer of the foam from which the sample pieces were taken from the plastic foam displaced with cellulose particles. The total height of the block was ca. 1 m. The cellulose-free plastic foam from example 2 was used to make a comparison.

TABLE 1

| Sample | Ex. 1 Top | Ex. 1 Middle | Ex. 1 Bottom | Ex. 2 |
|---|---|---|---|---|
| Standardised climate | 1.6% | 1.6% | 1.5% | 0.7% |
| Physical equilibrium moisture | 4.6% | 4.7% | 4.5% | 2.5% |

As may be seen from these figures, the foam displaced with cellulose particles absorbs significantly more moisture than the cellulose-free foam, both in the standard climate and in the other standardised climate with the physical equilibrium moisture. There is also a relatively good match for the measurement results in terms of the different points from which the sample pieces were taken (top, middle, bottom), enabling one to conclude that there was a homogeneous distribution of the cellulose particles in the foam element produced.

Table 2 below sets out the mechanical properties of the two foams made as specified in example 1 and example 2. It is clearly evident that the foam type made with cellulose particles has comparable mechanical properties to the foam that was not displaced with cellulose particles. This indicates problem-free processing of the reaction components, especially if they incorporate the spherical cellulose particles.

TABLE 2

| | Foam type | | | |
|---|---|---|---|---|
| | A | A | B | B |
| Proportion of powder (cellulose particles) | 0% | 10% | 0% | 7.50% |
| Density | 33.0 kg/m$^3$ | 33.3 kg/m$^3$ | 38.5 kg/m$^3$ | 43.8 kg/m$^3$ |
| Compression hardness 40% | 3.5 kPa | 2.3 kPa | 2.7 kPa | 3.0 kPa |
| Elasticity | 48% | 36% | 55% | 50% |
| Tear resistance | 140 kPa | 100 kPa | 115 kPa | 106 kPa |
| Expansion | 190% | 160% | 220% | 190% |
| Wet compression set (22 h./70% Comp./50° C./95% r.h.) | 6% | 50% | 6% | 9% |

The foam with no added cellulose particles should have the following desired values for both specified foam types:

|  | Foam type | |
| --- | --- | --- |
|  | A | B |
| Density | 33.0 kg/m³ | 38.5 kg/m³ |
| Compression hardness 40% | 3.4 kPa | 2.7 kPa |
| Elasticity | >44% | >45% |
| Tear resistance | >100 kPa | >100 kPa |
| Expansion | >150% | >150% |
| Wet compression set (22 h./70% Comp./50° C./95% r.h.) | <15% | <15% |

The average weight by volume or density of the foam element as a whole is within a range with a lower limit of 30 kg/m³ and an upper limit of 45 kg/m³.

Figure 1:
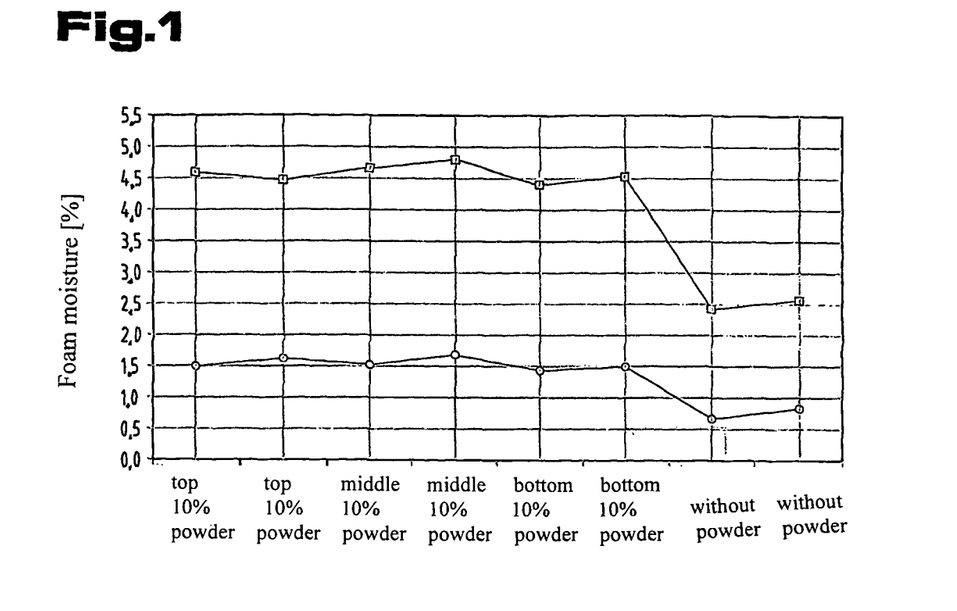
FIG. 1 is a first graph illustrating moisture absorption between two pre-defined climates based on different samples and different sampling points.

FIG. 1 gives the foam moisture as a percentage for sample bodies of the same type but taken from different points of the total foam element, as described above. The foam moisture as a [%] is plotted on the ordinate. The proportion of added cellulose powder or cellulose particles in this example is 10% by weight and the cellulose particles are the spherical cellulose particles described above. These different individual samples with and without additive are plotted on the abscissa.

The measurement points for the foam moisture of the individual samples shown as circles represent the initial value and the measurements shown as squares are for the same sample but after one day of moisture uptake. The lower initial values were determined for the standard climate described above and the other value shown for the same sample represents moisture uptake in the other standardised climate after 24 hours at 23° C. and 93% r.h. The abbreviation r.h. stands for relative humidity or air humidity and is given as a %.

Figure 2:
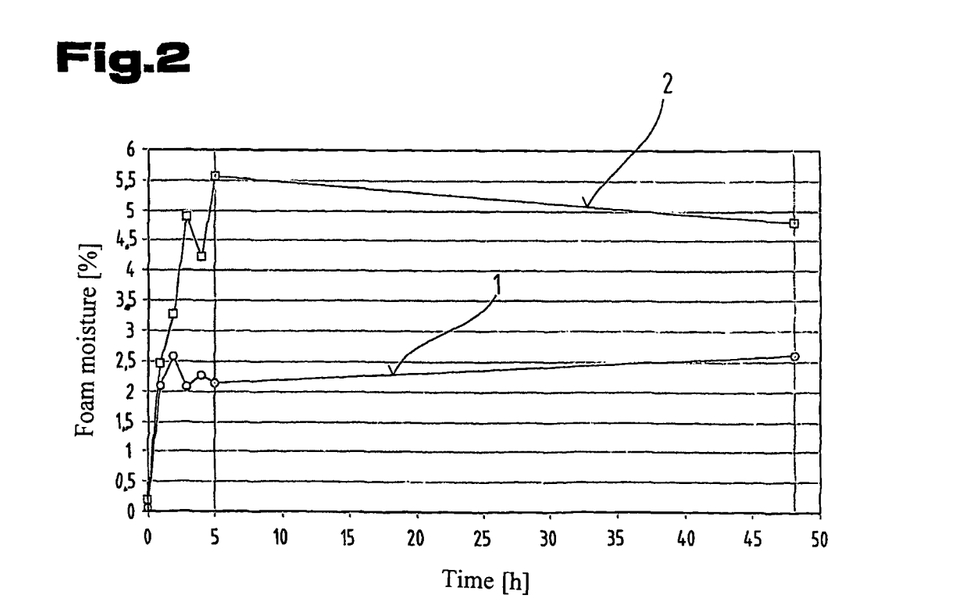
FIG. 2 is a second graph illustrating the different moisture absorbing capacity of conventional foam and foam displaced with cellulose particles.

FIG. 2 plots moisture uptake over a period of 48 hours, the values for time (t) being plotted on the abscissa in [h]. The initial state of the sample body is again that of the standard climate of 20° C. and 55% r.h. defined above. The other standardised climate at 23° C. and 93% r.h. is intended to represent a climate based on use or body climate to enable the period during which the foam moisture increased as a % by weight to be determined. The values for foam moisture are plotted on the ordinate as a [%].

A first graph line 1 with measurement points shown as circles represents a foam element with a pre-defined sample size based on example 2 with no added cellulose particles or cellulose powder.

Another graph line 2 with measurement points shown as squares represents the foam moisture of a foam element to which 7.5% by weight of cellulose particles or cellulose powder were added. The cellulose particles are again the spherical cellulose particles described above.

The graph plotting the moisture uptake over 48 hours shows that the physical equilibrium moisture of "the foams" in the "body climate" is reached after only a short time. From this, it can be assumed that the foam displaced with cellulose particles is able to absorb two times more moisture in 3 hours than a foam based on example 2 with no added cellulose particles.

The measurement values for the moisture uptake were obtained by storing the foam pieces with a volume of ca. 10 cm³ in a dessicator with a set air humidity (using saturated $KNO_3$ solution and 93% r.h.), having previously dried the samples. The samples were removed from the dessicator after defined times and the weight increase (=water uptake) measured. The fluctuations in the moisture uptake can be explained by the handling of the samples and a slight lack of homogeneity in the samples.

Figure 3:
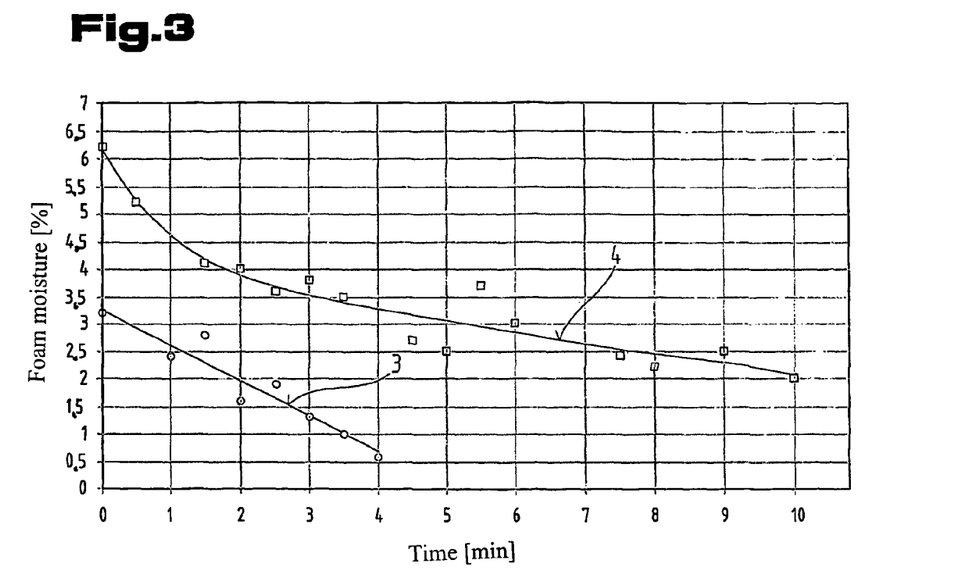
FIG. 3 is a third graph illustrating the different moisture evaporation rates of conventional foam and foam displaced with cellulose particles.

FIG. 3 illustrates the drying behaviour of a foam element with added cellulose particles based on example 1 compared with a foam based on example 2 with no such cellulose particles. For comparison purposes, the two sample pieces were firstly conditioned in the "body climate" for 24 hours. This was again at 23° C. with a relative humidity of 93%. The values for foam moisture are plotted on the ordinate as a [%] and the time (t) in [min] is plotted on the abscissa. The specified % values for foam moisture are percentages by weight relative to the mass or weight of the total foam elements (plastic foam, cellulose particles and water or moisture).

The measurement points shown as circles again relate to the foam element based on example 2 with no added cellulose particles plotting a corresponding graph line 3 representing the decrease in moisture. The measurement points shown as squares were determined for the foam element with added cellulose particles. Another corresponding graph line 4 likewise shows evidence of a rapid evaporation of the moisture. The proportion of cellulose particles was again 7.5% by weight.

It is clear that the equilibrium moisture of 2% is already restored after ca. 10 minutes. This is considerably faster than is the case with a foam known from the prior art which requires several hours for a comparable quantity of water to evaporate.

When the foam element displaced with the cellulose particles based on the crystal modification of cellulose-II was conditioned in the "body climate" for a period of 24 hours and then exposed to the "standard climate", it initially absorbed a moisture content of more than 5% by weight and the moisture content was reduced by at least 2% within a period of 2 min after being introduced into the "standard climate".

From the two graphs shown in FIGS. 2 and 3, it may be seen that the foam element displaced with particles, in particular those of cellulose, has a capacity of more than 3.5% by weight to absorb moisture at the "body climate" of 23° C. and relative humidity of 93% and is therefore higher than the value of the foam element with no added particles.

In this respect, it would also be possible to add additives to the base material or materials used to make the plastic foam in order to increase the ability of the plastic foam itself to absorb moisture, even without the particles. This additive is usually added to or admixed with the polyol component prior to foaming. However, the disadvantage of this is that the elasticity of the resultant plastic foam drops and is lower than that of the same plastic foam produced without the additive. In order to increase the elasticity of the plastic foam, its weight by volume must be increased, thereby increasing the elasticity again. The weight by volume or density should be selected so that it is greater than 45 kg/m³. The same applies to plastic foams with added particles, even if no additives were added to the base materials used to make the plastic foam with a view to increasing moisture absorption capacity.

For example, with a plastic foam with no added hydrophilic substance, a moisture absorption capacity of more than 2.8% by weight can be obtained in the "body climate" of 23° C. and 93% relative humidity.

Figure 4:
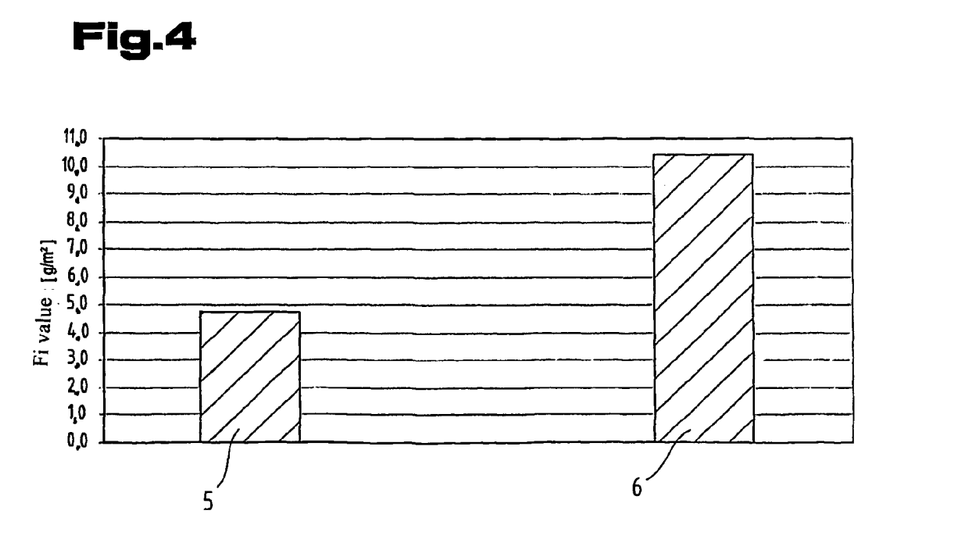
FIG. 4 is a bar graph illustrating the absorption of water vapour by conventional plastic foam and plastic foam displaced with cellulose particles.

FIG. 4 is a bar graph plotting the absorption of water vapour "Fi" based on Hohenstein in [g/m²] and these values are plotted on the ordinate. The "Fi" value for a material is a measurement indicating its capacity to absorb water vapour. The Fi value is determined by ascertaining the weight of the sample at the start of measuring and at the end of measuring and the difference in weight represents the water vapour absorbed over a short period.

The period during which the water vapour was absorbed from the standard climate of 20° C. and 55% r.h. defined above and in the standardised climate of 23° C. and 93% r.h. also defined above (application climate and body climate) for the two measurement values obtained was 3 (three) hours. The sample bodies were of foam type "B" described above. A first graph bar 5 plots foam type "B" without added cellulose or cellulose particles. The measured value in this case was approximately 4.8 g/m². The foam body displaced with cellulose, on the other hand, showed a higher value of ca. 10.4 g/m² and this is plotted on another graph bar 6. This other value is therefore higher than a value of 5 g/m² based on Hohenstein.

Figure 5:
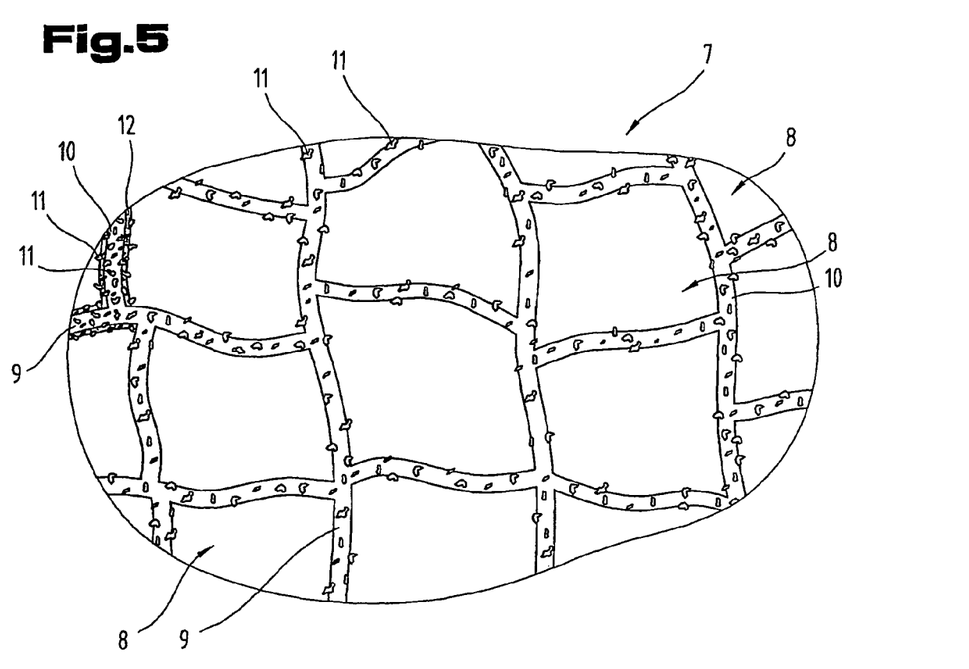
FIG. 5 is a simplified diagram on an enlarged scale illustrating a detail of the foam element with its foam structure.
Figure 6:
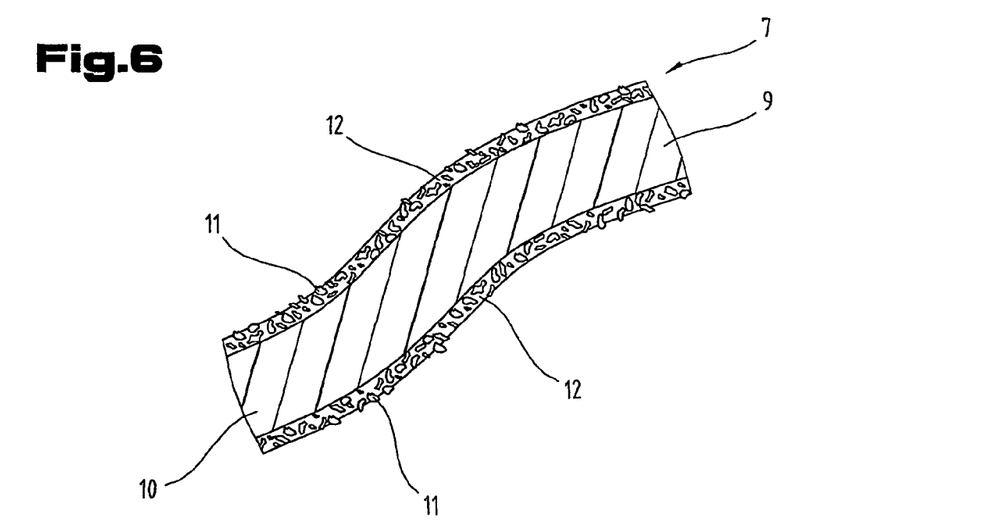
FIG. 6 is a simplified diagram on an enlarged scale illustrating another detail of a foam structure of the foam element.

FIGS. 5 and 6 illustrate a detail of the foam in particular the plastic foam forming the foam element 7 on a larger scale in which several cells 8 are schematically illustrated on a simplified basis. By cell 8 is meant a small cavity in the foam structure, which is partially and/or completely surrounded by cell walls 9 and/or cell webs 10. If the cell walls 9 are continuous and surround the cavity forming the cell 8 completely, it may be said that the foam structure is one based on closed cells. If, on the other hand, the cell walls 9 or cell webs 10 are only partial ones, it may be said that the foam structure is one based on open cells, in which case the individual cells 8 have a flow connection to one another.

As also illustrated on a simplified basis, the particles 11 described above are disposed or embedded in the foam, in particular the plastic foam of the foam element 7. It may be that only a partial quantity of the particles 11 is partially embedded in the plastic foam of the foam element 7. This means that these partial quantities of particles 11 are only partially disposed inside the plastic foam and they protrude out from the cell wall 9 or cell web 10 in the direction towards the cell 8 forming the cavity. Part-regions of the particles 11 are embedded in the plastic foam. Another partial quantity of particles 11 may be fully embedded in the cell structure of the plastic foam, however, and are thus completely surrounded by it.

As illustrated in a simplified format in the top left-hand part of FIG. 5, the plastic structure of the plastic foam is provided with an additional coating 12 or has one on its surface on one of the cell walls 9 or one of the cell webs 10. This coating 12 may be applied by an immersion or impregnating tank but also by some other coating process. This coating 12 should have a high permeability to moisture and the particles 11 may also be contained in the fluid used for the coating 12. This may be achieved by admixing and thus displacing the particles 11 with the coating 12 in the liquid state and the particles are held or bonded by means of the coating 12 in the form of an adhesion process during the drying process.

Independently of the above, however, it would also be possible for at least some of the particles 11 but usually all of the particles 11 to be provided with another separate coating, which also has a high permeability to moisture or water vapour.

Independently of the above however, and as may be seen from the detail illustrated in FIG. 6, it would also be possible for none of the particles 11 described above to be disposed in the cell wall 9 or cell web 10, and instead the particles 11 are contained exclusively in the schematically indicated coating 12, where they are held fixed in order to provide the desired absorption of moisture. The individual particles 11 may in turn be made from the different materials described above, and it would also be possible to use any combination of individual particles 11. These various combinations of different particles 11 would also be possible in terms of the disposition of the particles 11 on or in the cell walls 9 or cell webs 10.

FIGS. 7 to 15 provide a simplified illustration of the foam element 7, and the coating 12 described above may be applied to at least some regions of its surface 13. For the sake of simplicity and with a view to ensuring that the diagrams are clear, the cell walls 8 and cell webs 9 have been omitted and the foam element 7 as well as the coating 12 are each shown as a block on an exaggerated scale. The intention is to provide a clearer illustration of the possible ways of arranging the particles 11 in or on the foam element 7 and/or in or on the coating 12.

Figure 7:
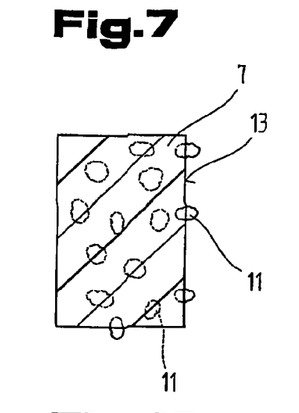
FIGS. 7-15 are highly schematic, simplified diagrams illustrating various ways in which the particles can be incorporated in the foam and the coating applied to it.

FIG. 7 shows the foam element 7 with the particles 11 described above incorporated in it, a proportion or a partial quantity of the particles 11 being disposed completely inside the foam whilst another proportion or partial quantity of the particles 11 is disposed extending out from the surface 13 of the foam material of the foam element 7. In this respect, a proportion or partial quantity of the total particles 11 is disposed in the region of the surface 13 so that they protrude from the surface 13, whilst a part-region or part-portion of these particles 11 is still embedded in the foam and is thus retained by it and secured. By a proportion or partial quantity of particles 11 is meant a specific quantity in terms of amount or depending on the number of pieces. The part-region or part-portion of the particle 11 refers to a specified size of an individual particle 11 based on volume.

Figure 8:
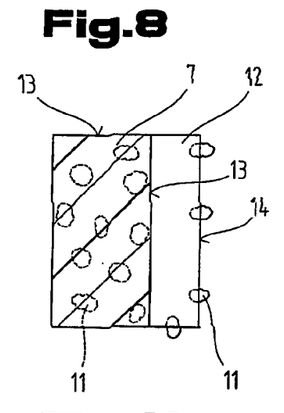

FIG. 8 illustrates another foam element 7 which is provided with the coating 12 described above. The particles 11 are all fully embedded in the foam element 7 and in this instance there are no particles 11 protruding out from the surface 13 of the foam material of the foam element 7. The coating 12 is in turn likewise displaced with particles 11 and in this instance all the particles 11 protrude out from a surface 14 of the coating 12. In this example of an embodiment, the particles 11 are disposed in the region of the surface 14 of the coating 12 and protrude out from it to a greater or lesser extent—depending on how deeply they are embedded—and are retained by the coating 12 because a part-portion of them still extends through the coating 12.

Figure 9:
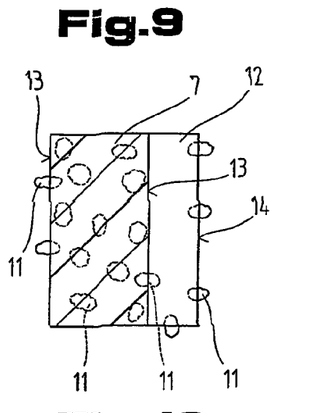

FIG. 9 illustrates another foam element 7 which is in turn provided with a coating 12 in at least the region of one of its surfaces 13. In this instance, some of the particles 11 are also completely embedded in the foam and a proportion or part-quantity of particles 11 also protrudes out from the surface 13 of the foam. The particles 11 in the coating 12 are all disposed exclusively in the region of the surface 14 in this instance and protrude out from it to a greater or lesser degree in at least certain regions, depending on how deeply they are embedded. As illustrated, a particle 11 in the contact region between the coating 12 and the foam of the foam element 7 may extend from the foam and through the coating 12 because a partial quantity of particles 11 is disposed protruding out from the surface 13 of the foam.

Figure 10:
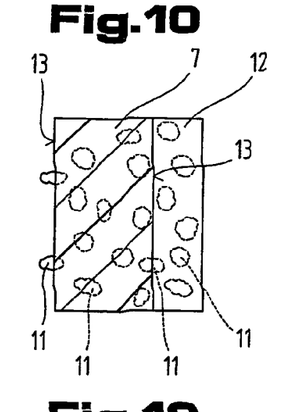

The particles 11 in the foam illustrated in FIG. 10 are disposed in the same manner as described in connection with FIG. 9. A partial quantity of particles 11 is therefore totally embedded in the foam of the foam element 7 and a partial quantity of particles 11 is in turn disposed protruding out from the surface 13 of the foam. The particles 11 of the coating 12 in this instance are disposed completely inside the coating 12. As illustrated in the case of one particle 11, it protrudes out from the surface 13 of the foam 7 across the surface 13 and thus also extends through the coating 12 once it has been applied.

Figure 11:
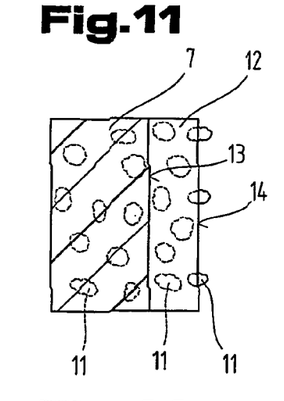

In the case of the foam element 7 illustrated in FIG. 11, all the particles 11 are disposed completely inside the foam used to make the foam element 7. The particles 11 disposed in the coating 12 are made up of a partial quantity which is disposed completely inside the coating 12 and another partial quantity protruding out from the surface 14.

Figure 12:
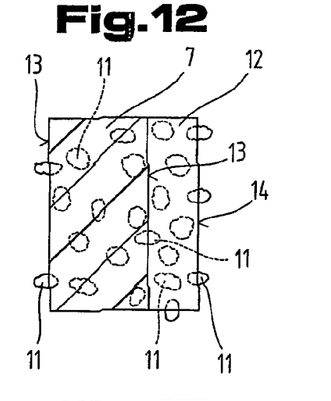

In the embodiment of the foam element 7 illustrated in FIG. 12, the particles 11 are fully embedded in the foam and a partial quantity in turn protrudes out from the surface 13 of the foam. Again, the coating 12 contains a partial quantity of particles 11 which are disposed completely inside the coating 12. Another partial quantity of particles 11 protrudes out from the surface 14 and a part-portion of the particles 11 is embedded in the coating 12.

Figure 13:
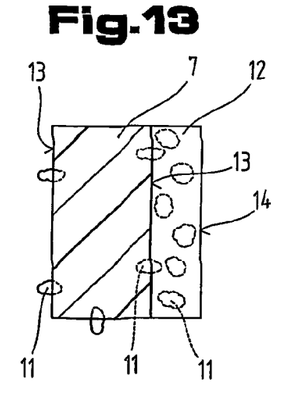

In the case of the embodiment illustrated in FIG. 13, the particles 11 are disposed in the foam so that they protrude exclusively out from certain regions of the surface 13 and a part-portion of these particles 11 is embedded in the foam. The particles 11 contained in the coating 12 are all completely embedded in it. As illustrated by just one particle 11, it may protrude out from the surface 13 of the foam into the coating 12.

Figure 14:
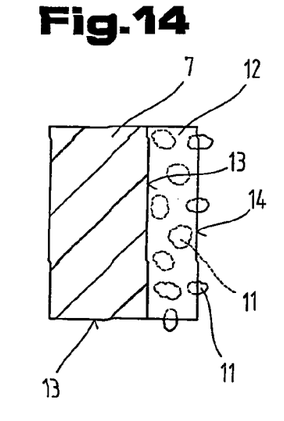

In the embodiment illustrated in FIG. 14, the foam does not contain any of the particles 11 described above. The coating 12, on the other hand, contains both a partial quantity of particles 11 which are disposed completely inside the coating 12 and another partial quantity which protrudes out from the surface 14.

Figure 15:
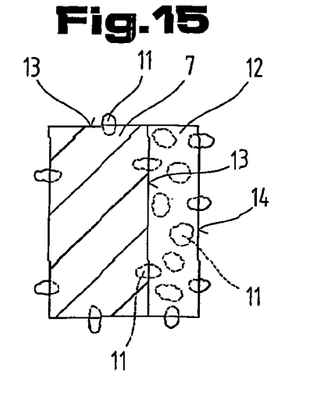

Finally, in the case of the embodiment illustrated in FIG. 15, the particles 11 are contained in the foam exclusively protruding out from the surface 13 and a part-portion of these particles 11 is disposed in the foam. There are no particles 11 fully embedded in the foam in this instance. The coating 12 contains both a partial quantity of particles 11 fully embedded in the coating 12 and another partial quantity of particles 11 protruding out from the surface 14 to a greater or lesser degree, depending on how deeply they are embedded. In the contact region between the foam and the coating 12, particles 11 are illustrated which protrude out from the surface 13 of the foam of the foam element 7 and which thus extend through the coating 12.

The foam element is made from a plastic foam, and a PU foam was used as the preferred foam. As explained above in connection with the individual diagrams, the moisture uptake was determined starting from a so-called equilibrium moisture representing a "standard climate" at 20° C. with a relative humidity of 55%. In order to simulate usage, another standardised climate was defined at 23° C. with a relative humidity of 93%. This other standardised climate is intended to represent the moisture absorbed during use due to a body of a living being exuding sweat, for example a person. The cellulose incorporated in the foam element is intended to disperse moisture absorbed during use over a period within a range with a lower limit of 1 hour and an upper limit of 16 hours again after use and thus restore the entire foam element to the equilibrium moisture by reference to the ambient atmosphere. This means that the stored moisture evaporates from the cellulose very rapidly after use, being emitted to the ambient atmosphere and thus drying the foam element.

As mentioned above, an equilibrium moisture can be said to exist when the foam element has been exposed to one of the ambient atmospheres described above to the degree that the moisture value of the foam element (foam moisture) is in equilibrium with the value of the moisture contained in the ambient atmosphere. On reaching the equilibrium moisture level, there is no longer any exchange of moisture between the foam element and the ambient atmosphere around the foam element.

The test methods described above can be run in such a way that the foam element is exposed to the first ambient atmosphere with the first climate based on the predefined temperature and relative air humidity, for example 20° C. and 55% r.h. until the equilibrium moisture is reached in this ambient atmosphere, after which the same foam element is exposed to a second, changed or different ambient atmosphere which is different from the first ambient atmosphere. This second ambient atmosphere has a second climate with a higher temperature and/or higher relative air humidity than the first climate, for example 23° C. and 93% r.h. As a result, the value of the foam moisture increases and the moisture is absorbed by the cellulose incorporated in the foam. The same foam element is then exposed to the first ambient atmosphere again, and after the period of between 1 hour and 16 hours specified above, the initial value of the foam moisture corresponding to the equilibrium moisture based on the first ambient atmosphere is restored. Within this period, therefore, the moisture absorbed by the cellulose from the second ambient atmosphere is evaporated to the ambient atmosphere and reduced as a result.

The lower value of 1 hour specified here will depend on the quantity of liquid or moisture absorbed but may also be significantly lower, in which case it may be just a few minutes.

Independently of the spherical cellulose particles described above, it is also possible to use cellulose in the form of cut fibres with a fibre length of within a lower limit of 0.1 mm and an upper limit of 5 mm. However, it would likewise be possible to use cellulose in the form of ground fibres with a particle size within a lower limit of 50 μm and an upper limit of 0.5 mm.

Depending on the application, the foam to be produced will have different foam properties and these are characterised by a range of different physical properties. For example, the density may fall within a lower limit of 14 kg/m$^3$ and an upper limit of 100 kg/m$^3$. The compression hardness at 40% compression may be within a lower limit of 1.0 kPa, preferably 2.5 kPa, and an upper limit of 10.0 kPa, preferably 3.5 kPa. The elasticity as measured by the ball drop test may have a value with a lower limit of 5% and an upper limit of 70%. However, this range of values may also fall between a lower limit of 25%, preferably 35%, and an upper limit of 60%, preferably 50%. This test method is carried out in accordance with standard EN ISO 8307 and the rebound height and associated reverse parallel elasticity are determined.

If the foam element produced is made from a polyurethane foam, in particular a flexible foam, it may be produced with both a base of TDI and a base of MDI. However, it would also be possible to use other foams such as polyethylene foam, polystyrene foam, polycarbonate foam, PVC foam, polyimide foam, silicone foam, PMMA (polymethylmethacrylate) foam, rubber foam, which form a foam structure in which the cellulose can be embedded. Depending on the foam material selected, it may be said that the foam is a plastic foam or alternatively a foam rubber, e.g. latex foam. The high moisture uptake will then depend on the raw material system and the method used to produce the foam because the reversible capacity to absorb moisture is obtained by incorporating or embedding the cellulose. It is preferable to use foam types with open pores, which enable an unhindered exchange of air with the ambient atmosphere. It is also essential to ensure that the cellulose is distributed uniformly in the foam structure, as described above in connection with the tests. In the absence of a foam structure with open pores, this can be achieved by known treatments to impart open cells.

If polyol is used as an initial material for one of the reaction components, the cellulose can be added to it prior to foaming. The cellulose may be added by stirring it in or dispersing it using methods known in the industry. The polyol used is the one needed for the corresponding foam type and is added in the requisite quantity specified in the formula. However, the moisture content of the cellulose particles must be taken into account when setting up the formula.

As explained above, the particles 11 are preferably introduced into and displaced with the components making up the plastic foam prior to the foaming process. In order to obtain a uniform distribution within the usually liquid base material, it is of advantage if the difference between the weight by volume or density of the particles 11 and the initial material used to make the plastic foam, for example polyol, is within a range of ±–10%, preferably ±–0.5% to ±–3.0%. It is of particular advantage if the particles 11 and the initial material used to make the plastic foam, for example polyol, respectively have a volume by weight or density which is approximately the same. This will prevent any unintentional sinking and ensure that a uniform distribution of particles 11 is obtained within the plastic foam to be produced.

For reasons of quality, there are currently plans to opt for a density of 45 kg/m$^3$ and higher for mattresses.

The polyol is added to the mixing container by means of metering pumps at a metered quantity of 60 kg/min to 150 kg/min and at a temperature of between 18° C. and 30° C. The specified quantity of polyol must be adhered to exactly so that the particles 11 to be admixed, in particular the cellulose, can be added in a defined mixing ratio. The mixture ratio of polyol to particles 11 is 5 parts+1 part to 2 parts+1 part. The particles 11 are not fed in with a slow running, earthed screw conveyor because the entire mixing area is in an environment protected against explosion. A mixture of particles 11, in particular the cellulose powder, with air will result in explosive dust in a specific mixing ratio.

The quantity of particles 11, such as the cellulose powder, is added to the polyol at a set rate of 3 kg/min to 6 kg/min to ensure that a continuous distribution of the dissolver in the drum region results in an agglomerate-free dispersion. The finished dispersion is mixed for a period of between 10 minutes and 20 minutes. To obtain optimum nucleation, the dispersion is de-gassed with a vacuum of –0.6 bar for a period of 3 minutes. An adverse gas charge in the mixture would otherwise lead to problems during foam production.

Another crucial factor is the time at which processing takes place once the dispersion has been formed. Processing must take place within a period of one and three hours. If processing does not take place within this period, the density (kg/m$^3$) of the foam to be produced may not conform to the required value and will therefore exhibit pronounced variances.

The material heated by the mixing process is brought back to a processing temperature of between 20° C. and 25° C. again. From this point on, the polyol-particle dispersion is ready for processing in the foaming machine.

When setting up the production formula for the foam to be produced, account still has to be taken of the current weather conditions, such as air pressure and relative air humidity. Allowance must also be made for the moisture in the prepared cellulose powder when calculating the components. The temperature of the raw material must also be taken into account for the appropriate creme zone of the mixture to be foamed. "Under-foaming" will lead to defects in the interior of the block. This can be prevented by altering the quantity of amine added. The nature of the open pores can be regulated by adjusting the tin catalyst, thereby enabling tear-free blocks to be produced. A foam of optimum quality can be obtained in this manner.

A variation in the mixing chamber pressure of between 1.1 bar and 1.8 bar causes a change in pore size in order to produce the desired foam structure.

Another important factor for an ideal foaming process is the speed of the conveyor belt in combination with the quantity ejected. For example, the feed rate is between 2 m/min and 5 m/min for an ejected quantity of between 60 kg/min and 150 kg/min.

In addition to producing blocks of an optimum rectangular shape, the "Planiblock" system also produces a uniform distribution of hardness, density and particles 11, in particular the cellulose, through the cross-section or volume of the entire foam block.

The blocks are cured and cooled in storage premises protected from the weather. In this respect, long cooling times of at least twenty hours result in the best qualities.

These raw blocks with the particles 11 incorporated in them are then despatched to storage for further processing. The particles 11 contained in the foam do not affect subsequent processing of the foam in any way.

The foam is preferably cut on various machines with circumferentially extending belt measuring systems. In addition to making simple straight cuts on horizontal cutter machines and vertical cutter machines, it is also possible to cut more complicated shapes in two and three-dimensional directions on CNC automatic copiers and machines for cutting special shapes.

It may also be of advantage if aloe vera is added to the foam, in particular the plastic foam and/or particles 11 and/or coating 12 as an ingredient or active ingredient. This may be done by adding it to or admixing it with and thus displacing one of the base or initial materials used to make the foam, in particular the plastic foam and/or the particles 11 and/or the coating 12 for the manufacturing process. Irrespective of the above, however, it would also be possible to add aloe vera as an ingredient or active ingredient to the foam, in particular the plastic foam and/or particles 11 and/or coating 12 afterwards using a various range of known methods. These might include a spraying process or an immersion process in an immersion tank, for example.

The foam element may be used to make individual foam plastic products, in particular of plastic and the products may be selected from the group comprising mattresses, seats or seat parts for vehicles such as cars, trains, trams, aircraft, camping furniture, cladding parts for motor vehicles such as door claddings, roof coverings, luggage compartment cladding, engine compartment cladding, shoe soles and other parts of shoes such as shoe insoles, cushioning for belts, cushioning for helmets, furniture padding, pillows and cushions, padding for medical dressings.

The embodiments illustrated as examples represent possible variants of the foam element with a hydrophilic substance in the form of cellulose incorporated in the plastic foam, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

LIST OF REFERENCE NUMBERS

1 Graph line
2 Graph line
3 Graph line
4 Graph line
5 Graph bar
6 Graph bar
7 Foam element
8 Cell
9 Cell wall
10 Cell web
11 Particle
12 Coating

What is claimed is:

1. A foam element made from a foam having a foam structure comprising cell walls and particles of at least one hydrophilic,
wherein the foam element has a reversible capacity to absorb moisture,
wherein the particles are made from timber materials and the particle size is smaller than 400 µm,
wherein the particles are approximately spherical,
wherein a partial quantity of the particles is completely embedded within the cell walls of the foam structure,
wherein another partial quantity of the particles is disposed protruding out from a surface of the cell walls of the foam structure, and
wherein the foam without the particles has a moisture absorption capacity of more than 2.8% by weight at an equilibrium moisture corresponding to a temperature of 23° C.

2. The foam element as claimed in claim 1, wherein the foam element has a compression hardness at a compression depth of 40% with a lower limit of 1 kPa and an upper limit of 10 kPa.

3. The foam element as claimed in claim 1, wherein the foam element has an elasticity based on the ball drop test in accordance with EN ISO 8307 with a lower limit of 5% and an upper limit of 70%.

4. The foam element as claimed in claim 1, wherein the foam displaced with the particles has a moisture absorption capacity of more than 3.5% by weight corresponding to an equilibrium moisture at 23° C. and a relative humidity of 93%.

5. The foam element as claimed in claim 1, wherein the amount of the particles by reference to the total weight of the foam is in a range with a lower limit of 0.1% by weight and an upper limit of 35% by weight.

6. The foam element as claimed in claim 1, wherein the weight by volume or density of the foam displaced with the particles is more than 45 kg/m³.

7. The foam element as claimed in claim 1, wherein the particles are made from cellulose, and
wherein the particles have:
a structure type based on the crystal modification of cellulose-I, or
a structure type based on the crystal modification cellulose-II.

8. The foam element as claimed in claim 7, wherein the particles have a particle size with a lower limit of 1 µm.

9. The foam element as claimed in claim 7, wherein the particles have an axial ratio with a lower limit of 0.5 and an upper limit of 5.

10. The foam element as claimed in claim 7, wherein the amount of the cellulose by reference to the total weight of the foam is selected so that it lies within a lower limit of 0.1% by weight and an upper limit of 25% by weight.

11. The foam element as claimed in claim 7, wherein the cellulose contains at least one additive selected from the group consisting of pigments, inorganic substances, barium sulphate, ion exchangers, polyethylene, polypropylene, polyester, carbon black, zeolite, activated carbon, polymeric superabsorbers and flame retardants.

12. The foam element as claimed in claim 1, wherein the particles of timber materials are coated with a substance to inhibit rotting or the particles of timber materials are impregnated with a substance to inhibit rotting.

13. The foam element as claimed in claim 1, wherein the particles are provided with a coating having a high permeability to moisture and water vapor.

14. The foam element as claimed in claim 1, wherein the foam is a plastic foam,
wherein a polyol is used to make the plastic foam, the polyol having a weight by volume or density,
wherein the particles apart from the foam have a weight by volume or density, and
wherein the difference between the weight by volume or density of the particles apart from the foam and the weight by volume or density of the polyol lies within a range of +/−10%.

15. The foam element as claimed in claim 14, wherein the weight by volume or density of the particles apart from the foam is approximately the same as the weight by volume or density of the polyol.

16. The foam element as claimed in claim 1, wherein the foam structure is provided with a coating having a high permeability to moisture, and
wherein the coating is also displaced with the particles.

17. The foam element as claimed in claim 16, wherein a part of the particles is completely embedded in the coating, and
wherein another part of the particles is disposed protruding out from a surface of the coating.

18. The foam element as claimed in claim 1, wherein aloe vera is added to the foam as an active ingredient.

19. The foam element as claimed in claim 1, wherein the foam is selected from a group consisting of polyurethane foam (PU foam), polyethylene foam, polystyrene foam, polycarbonate foam, PVC foam, polyimide foam, silicone foam, PMMA (polymethylmethacrylate) foam, and rubber foam.

20. The foam element as claimed in claim 19, wherein the foam structure is an open cell foam structure.

21. A foam product,
wherein the foam product is a member selected from the group consisting of a mattress, a seat or a seat part for vehicles, camping furniture, a cladding part for motor vehicles, a shoe sole, a shoe insole, cushioning for a belt, cushioning for a helmet, furniture padding, a pillow, a cushion, padding for a medical dressing,
wherein the member is a foam product made from:
a foam having a foam structure comprising cell walls, and
particles of at least one hydrophilic,
wherein the foam product has a reversible capacity to absorb moisture,
wherein the particles are made from timber materials and the particle size is smaller than 400 µm,
wherein the particles are approximately spherical,
wherein a partial quantity of the particles is completely embedded within the cell walls of the foam structure, wherein another partial quantity of the particles is disposed protruding out from a surface of the cell walls of the foam structure, and wherein the foam without the particles has a moisture absorption capacity of more than 2.8% by weight at an equilibrium moisture corresponding to a temperature of 23° C.

22. The foam element as claimed in claim 1, wherein the foam comprises foam cells comprising cavities at least partially surrounded by the cell walls or cell webs, and wherein the partial quantity of the particles disposed protruding out from the surface of the foam protrude out from the cell walls or the cell webs into the cavities.

23. The foam element as claimed in claim 7, wherein the cellulose contains at least one additive selected from the group consisting of titanium oxide and below stoichiometric titanium oxide.

24. A foam element made from a foam having a foam structure comprising cell walls and particles of at least one hydrophilic, wherein the foam element has a reversible capacity to absorb moisture, wherein a proportion of the particles by reference to the total weight of the foam is in a range with a lower limit of 0.1% by weight and an upper limit of 35% by weight, wherein the weight by volume or density of the foam displaced with the particles is more than 45 kg/m$^3$, wherein the particles are approximately spherical, wherein a partial quantity of the particles is completely embedded within the cell walls of the foam structure, wherein another partial quantity of the particles is disposed protruding out from a surface of the cell walls of the foam structure, wherein the foam without the particles has a moisture absorption capacity of more than 2.8% by weight at an equilibrium moisture corresponding to a temperature of 23° C., wherein the foam element has a compression hardness at a compression depth of 40% with a lower limit of 2.5 kPa and an upper limit of 3.5 kPa, and wherein the foam element has an elasticity based on the ball drop test in accordance with EN ISO 8307 with a lower limit of 25% and an upper limit of 60%.

25. A foam element made from a foam and particles of at least one hydrophilic, wherein the foam element has a reversible capacity to absorb moisture, wherein the foam is a plastic foam having a foam structure comprising cell walls, wherein a polyol is used to make the plastic foam, wherein the particles are made from cellulose, wherein the particles have a structure type based on the crystal modification of cellulose-II, wherein the particles are approximately spherical, wherein a partial quantity of the particles is completely embedded within the cell walls of the foam structure, wherein another partial quantity of the particles is disposed protruding out from a surface of the cell walls of the foam structure, and wherein the foam without the particles has a moisture absorption capacity of more than 2.8% by weight at an equilibrium moisture corresponding to a temperature of 23° C.

* * * * *